(12) United States Patent
Gariepy et al.

(10) Patent No.: US 10,462,076 B2
(45) Date of Patent: Oct. 29, 2019

(54) SYSTEM, APPARATUS AND METHOD FOR AUTOMATIC ENVIRONMENTAL DATA COLLECTION AND ANALYSIS

(71) Applicant: CLEARPATH ROBOTICS, INC., Kitchener (CA)

(72) Inventors: Ryan Christopher Gariepy, Kitchener (CA); Matthew Allen Rendall, Waterloo (CA); Andrew Clifford Blakey, Waterloo (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 932 days.

(21) Appl. No.: 14/270,882

(22) Filed: May 6, 2014

(65) Prior Publication Data

US 2015/0323699 A1   Nov. 12, 2015

(51) Int. Cl.
    G05D 1/00      (2006.01)
    G05B 15/00     (2006.01)
    H04L 12/58     (2006.01)
    G01V 9/00      (2006.01)

(52) U.S. Cl.
    CPC ............. H04L 51/04 (2013.01); G01V 9/00 (2013.01); G05B 15/00 (2013.01); G05D 1/00 (2013.01); *H04L 51/20* (2013.01)

(58) Field of Classification Search
    CPC .................................. G01D 9/28; G01V 9/00
    See application file for complete search history.

(56) References Cited

U.S. PATENT DOCUMENTS

| | | | |
|---|---|---|---|
| 2009/0012667 A1 | 1/2009 | Matsumoto et al. | |
| 2010/0030417 A1* | 2/2010 | Fang ................. | G05D 1/0274 701/25 |
| 2013/0086215 A1* | 4/2013 | Trotta ............... | G06F 17/30241 709/217 |
| 2013/0231779 A1 | 9/2013 | Purkayastha et al. | |
| 2015/0217455 A1 | 8/2015 | Kikkeri et al. | |
| 2016/0271800 A1 | 9/2016 | Stubbs et al. | |
| 2017/0113352 A1 | 4/2017 | Lutz et al. | |

OTHER PUBLICATIONS

Wikipedia Vehicular Automation, https://web.archive.org/web/20140402022211/https://en.wikipedia.org/wiki/Vehicular_automation, retrieved by Archive.org on Apr. 2, 2014 (Year: 2014).*
http://www.digitalglobe.com/ downloaded on May 6, 2014.

* cited by examiner

Primary Examiner — Alexander Satanovsky
Assistant Examiner — Mark I Crohn
(74) Attorney, Agent, or Firm — Bereskin & PARR LLP/S.E.N.C.R.L., s.r.l.

(57) ABSTRACT

A system, apparatus and method for automatic environmental data collection and analysis are provided, including a server comprising: a processor and a communication interface, the processor configured to: receive, using the communication interface, a geographic survey request from a first computing device; translate the geographic survey request into mission data for collecting geographic survey data; transmit, using the communication interface, the mission data to a second computing device associated with a geographic survey entity; receive, using the communication interface, the geographic survey data collected by the geographic survey entity using the mission data; analyze the geographic survey data to generate processed geographic survey data; and, transmit, using the communication interface, the processed geographic survey data to the first computing device.

14 Claims, 11 Drawing Sheets

SYSTEM, APPARATUS AND METHOD FOR AUTOMATIC ENVIRONMENTAL DATA COLLECTION AND ANALYSIS

FIELD

The present specification relates environmental technologies and specifically to a system, apparatus and method for automatic environmental data collection and analysis.

BACKGROUND

Accurate and up-to-date environmental data about the world is important to many institutions and industries that rely on it for decision making and forecasting purposes. This environmental data can include information which is directly observable by humans, such as 2D (two dimensional) building plans and 3D (three dimensional) models of the environment, information which is difficult for humans to observe directly, such as depths of water bodies, and information which cannot be observed directly by humans, such as water quality.

SUMMARY

The present specification provides a system method and apparatus for automatic environmental data collection and analysis which can increase the efficiency of collecting the environmental data for decision making purposes. A server is provided that is placed between organizations requesting environmental data and entities that collect environmental data, such as surveying entities, the server mediating requests and data transfer between the organizations and the surveying entities. The server mediates requests for environmental data and analyzes collected raw environmental data. Hence, the server can further distribute "work", i.e. requests to collect environmental data, to differently equipped surveying entities, some of which can be spread out geographically. The work, which can also be referred to as mission data, can be structured such that the environmental data can collected by specialized hardware, such as unmanned vehicle systems (UVS).

Once an organization requesting environmental data identifies that they would like environmental data about a geographic area, the server generates a set of instructions on data collection without requiring the organization to possess expert knowledge in environmental data collection techniques. A graphical interface can be provided where desired types of environmental data can be requested.

The server also mediates collection of environmental data in a standardized fashion, with a high degree of accuracy and/or repeatability, and can interpret collected data to determine certain features which can be identified as significant for proper decision making and/or forecasting.

Indeed, the server generally simplifies the process by which organizations requesting environmental data can acquire such from surveying entities. For example the organization can specify a geographic area for environmental data collection and one or more types of environmental data they desire, and the server mediates collection of such by the surveying entities. The organizations do not have to concern themselves with the method of environmental data collection and any intermediate analysis. Similarly, the server obviates surveying entities from performing repetitive tasks. As the server has specialized analytic functions, the environmental data provided to the organizations requesting the environmental data can be summarized for individuals who are not skilled in the art of environmental data analysis.

An example non-limiting implementation provides a cloud-based infrastructure to present a web interface to an end-user (e.g. at an organization requesting environmental data), which is used to specify a mission definition, which can include defining a body of water, selecting the type of water sensor to be used, selecting a maximum age of the information, and choosing a desired spatial density of the data collection. The server can then perform automatic validation of the mission definition. For example, the server can verify that the size of the body of water does not exceed a size that can be surveyed by surveying entities. Such validations can be based on communication range restrictions, power limitations, and the like. Once the mission definition is validated, a central database of pre-existing raw data can be searched for a suitable candidate dataset. If there is no suitable candidate dataset, a mission plan can be generated.

In a further example implementation, the mission definition uses the bounds of a body of water and target spatial density to generate a set of geographic sample points at which a sensor reading can be taken. More specifically, the water body can be approximated by an ellipsoid with the quantity of geographic sample points equal to the area of the ellipsoid multiplied by the desired spatial density. A grid can then be overlaid according to the semi-major and semi-minor axes of the ellipsoid such that the each geographic survey point will be at the intersections of the gridlines, the amount of geographic survey points within the body of water can be equal to the quantity of points previously determined, and the ratio of gridlines along the semi-major axis of the ellipsoid to those along the semi-minor axis can be approximately equal to the ratio of the lengths of the semi-minor to the semi-major axis. An optimal path which traverses these geographic sample points is then generated and associated with the set of geographic sample points.

Given the mission definition and a set of methods for accomplishing missions of its general type, a time and cost estimate can be provided. A plan for providing the environmental data and the estimates can then be incorporated as part of the mission definition, stored within the cloud infrastructure and presented to the user for acceptance.

In implementations where raw geographic survey data corresponds to the mission definition exists and/or is stored in a memory available to the server, and in implementations where a new data collection mission is to be deployed, payment confirmation can be provided to the end-user and processed accordingly. The payment processing can be automatic via credit card and the like, and/or payment processing can comprise at least a degree of manual intervention. In implementations where a new data collection mission is to be deployed, basic confirmation of the logistics surrounding the mission can also take place. These logistics may include safety procedures, site contact information, and/or available dates and times for surveys.

The server can further enable execution of a data collection mission to be executed without the involvement of the initial end-user. When a new data collection mission is available, it is compared with a database of entities, such as survey entities that are capable of executing data collection missions of the given type at the requested location, based on previously declared capabilities and location preferences, which can be stored in a memory accessible to the server. The server can further provide a plurality of types of notifications to the survey entity (and/or a data collection team) that a new mission is available for acceptance. The survey entity is then presented with the mission definition for review. This presentation can be provided via similar infrastructure which the original end-user used to enter the mission definition (e.g. a similar GUI). When the survey entity chooses not to accept the mission, it can be presented to other survey entities and/or data collection teams stored in the memory. When the survey entity does choose to accept the mission, it can be presented with an option to modify the proposed mission definition. The server can further provide the mission definition to the tools of the is provided in a format, processable by the tools, including, but not limited to, one or more of a data collection tool, a robot, an unmanned vehicle, an unmanned survey craft, an unmanned aerial vehicle, and an unmanned ground vehicle to collect the geographic survey data. In an example implementation, the tools of the data collection team can be built into, one or more of a data collection tool, a robot, an unmanned vehicle, an unmanned survey craft, an unmanned aerial vehicle, and an unmanned ground vehicle, to collect the geographic survey data which is enabled to log sensor data of the specified type at each of the geographic survey points and travel between geographic survey points. This travel between geographic survey points can be manually directed, computer controlled, and/or a combination. The unmanned surface craft can be configured to log associated data such as unmanned surface craft status and combine it with the sensor data to form a consolidated set of geographic survey data (which can also be referred to as mission data).

As the surveying entity and/or data collection team is undertaking the mission, the tools they use can be optionally enabled to assess in real-time or in post-processing the accuracy and completeness of the data collection mission. The aspect of the tools which log the mission data for later analysis and presentation can also be configured to collect additional mission data to enhance and/or correct for deficiencies discovered in the original mission definition. Once the data collection mission is complete, pertinent information can be placed in a form for transfer from the tools. This transfer can take place via a physical medium such as a flash drive or via a wireless link such as a cellphone link, and the like. Optionally, the mission data can be encrypted either at the point of collection or at the point of transmission. Upon receipt of the mission data, partial payment of the data collection team can occur, for example before the end-user has formally accepted the information. This partial payment can be determined as a fixed value or optionally weighted based on a combination of factors such as previous history, logistics associated with the mission, or mission scale.

In some implementations, the server can automatically analyze the mission data. For example, the server can receive the mission data either via a physical medium and/or via a wireless link. In the latter case, the mission data can be received automatically from the tools through which the mission data was collected. Optionally, the server can be implemented within the same infrastructure used to define the mission and review the mission. The mission data then undergoes initial processing. Example initial processing can include, but is not limited to, reduction of the mission data to an ideal number of points using a geostatistical approach. The mission data can then be optionally presented for initial review and possible modification by a subject matter expert. The mission data can be automatically analysed to determine features such as volume, surface area, average temperatures, or approximate triangular meshes. The analysis can optionally include a comparison to a plurality of previous sets of similar mission data. Examples of similarity between mission data include features such as precise geographic location, area, volume, latitude, climate, or the like.

Upon completion of the automatic analysis, the server can generate a human-readable report with key findings summarized, graphics properly formatted, and the like. In the case where there are contractual obligations which specify the need for human review, the human-readable report is presented for review, modification, and acceptance by a subject matter expert. The report can then be automatically transmitted to the end-user. Throughout this process, the survey entity and/or data collection team which is responsible for the mission data can automatically receive incremental payments based on the level of acceptance of the mission data and its derivative products. Likewise, additional payment processing from the end-user can occur once the human-readable report is approved.

An aspect of the specification provides a server comprising: a processor and a communication interface, the processor configured to: receive, using the communication interface, a geographic survey request from a first computing device; translate the geographic survey request into mission data for collecting geographic survey data; transmit, using the communication interface, the mission data to a second computing device associated with a geographic survey entity; receive, using the communication interface, the geographic survey data collected by the geographic survey entity using the mission data; analyze the geographic survey data to generate processed geographic survey data; and, transmit, using the communication interface, the processed geographic survey data to the first computing device.

The geographic survey request can comprise one or more of: a location to survey; transect data; buffer data; mission definition data; and a request for one or more of: volume of a body of water; depth of the body of water; sediment in the body of water; fish locations in the body of water; traffic patterns; surface area; average temperatures; approximate triangular meshes; perimeter estimation; area estimation; cross-section extraction; historical trending; gradient computation; building plans; 2D (two dimensional) building plans; environmental contamination; water quality; air quality; positions of salient objects; soil chemistry; flow rates; and 3D (three dimensional) models of the environment.

The processor can be further configured to: check whether the geographic survey request can comprise a viable geographic survey request; and, response to determining that the geographic survey request can comprise unviable geographic survey request, transmit another request for updated geographic survey data. The another request for updated geographic survey data can comprise a suggested viable geographic survey request.

The processor can be further configured to: generate an estimate of one or more of a time and a cost to provide the processed geographic survey data; transmit the estimate to the first computing device prior to transmitting the mission data to a second computing device; and proceed with transmitting the mission data to a second computing device when an acceptance of the estimate is received from the first computing device.

The processor can be further configured to: compare the geographic survey request with sets of existing geographic survey data stored in a memory; and, when the geographic survey request corresponds to one or more of the sets of existing geographic survey data, then one or more of skipping the translate, the transmit and the receive, and analyze the one or more of the sets of existing geographic survey data to generate the processed geographic survey data.

The mission data can comprise data for instructing one or more of a data collection tool, a robot, an unmanned vehicle, an unmanned survey craft, an unmanned aerial vehicle, and an unmanned ground vehicle to collect the geographic survey data.

The mission data can comprise data for instructing a surveyor to collect the geographic survey data.

The geographic survey data can comprise one or more of: bathymetric data; distance data; fish location data; traffic data; perimeter estimation; area estimation; cross-section extraction; historical trending; gradient computation; building plans; 2D (two dimensional) building plans; environmental contamination; water quality; air quality; positions of salient objects; soil chemistry; flow rates; and 3D (three dimensional) models of the environment.

Another aspect of the specification provides a method comprising: at a server comprising a processor and a communication interface, receiving, using the communication interface, a geographic survey request from a first computing device; translating, using the processor, the geographic survey request into mission data for collecting geographic survey data; transmitting, using the communication interface, the mission data to a second computing device associated with a geographic survey entity; receiving, using the communication interface, the geographic survey data collected by the geographic survey entity using the mission data; analyzing, using the processor, the geographic survey data to generate processed geographic survey data; and, transmitting, using the communication interface, the processed geographic survey data to the first computing device.

The geographic survey request can comprise one or more of: a location to survey; transect data; buffer data; mission definition data; and a request for one or more of: volume of a body of water; depth of the body of water; sediment in the body of water; fish locations in the body of water; traffic patterns; surface area; average temperatures; approximate triangular meshes; perimeter estimation; area estimation; cross-section extraction; historical trending; gradient computation; building plans; 2D (two dimensional) building plans; environmental contamination; water quality; air quality; positions of salient objects; soil chemistry; flow rates; and 3D (three dimensional) models of the environment.

The method can further comprise: checking whether the geographic survey request can comprise a viable geographic survey request; and, response to determining that the geographic survey request can comprise unviable geographic survey request, transmitting another request for updated geographic survey data. The another request for updated geographic survey data can comprise a suggested viable geographic survey request.

The method can further comprise: generating an estimate of one or more of a time and a cost to provide the processed geographic survey data; transmitting the estimate to the first computing device prior to transmitting the mission data to a second computing device; and proceeding with transmitting the mission data to a second computing device when an acceptance of the estimate is received from the first computing device.

The method can further comprise: comparing the geographic survey request with sets of existing geographic survey data stored in a memory; and, when the geographic survey request corresponds to one or more of the sets of existing geographic survey data, then one or more of skipping the translating, the transmitting and the receiving, and analyzing the one or more of the sets of existing geographic survey data to generate the processed geographic survey data.

The mission data can comprise data for instructing one or more of a data collection tool, a robot, an unmanned vehicle, an unmanned survey craft, an unmanned aerial vehicle, and an unmanned ground vehicle to collect the geographic survey data.

The mission data can comprise data for instructing a surveyor to collect the geographic survey data.

The geographic survey data can comprise one or more of: bathymetric data; distance data; fish location data; traffic data; perimeter estimation; area estimation; cross-section extraction; historical trending; gradient computation; building plans; 2D (two dimensional) building plans; environmental contamination; water quality; air quality; positions of salient objects; soil chemistry; flow rates; and 3D (three dimensional) models of the environment.

Yet a further aspect of the specification provides a computer program product, comprising a computer usable medium having a computer readable program code adapted to be executed to implement a method comprising: at a server comprising a processor and a communication interface, receiving, using the communication interface, a geographic survey request from a first computing device; translating, using the processor, the geographic survey request into mission data for collecting geographic survey data; transmitting, using the communication interface, the mission data to a second computing device associated with a geographic survey entity; receiving, using the communication interface, the geographic survey data collected by the geographic survey entity using the mission data; analyzing, using the processor, the geographic survey data to generate processed geographic survey data; and, transmitting, using the communication interface, the processed geographic survey data to the first computing device. The computer usable medium can comprise a non-transitory computer usable medium.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
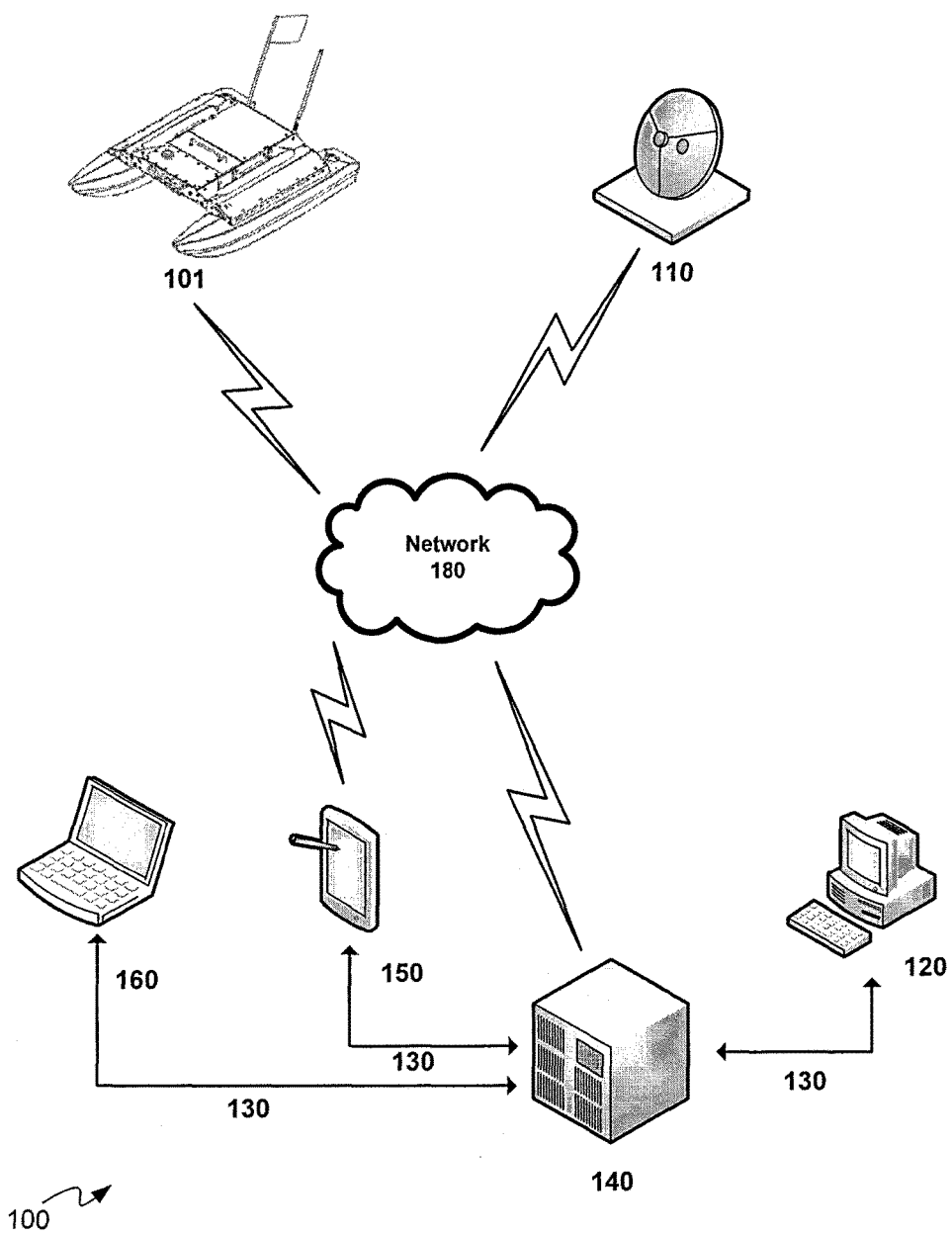
FIG. 1 depicts a system for automatic environmental data collection and analysis, according to non-limiting implementations.

FIG. 1 depicts a system 100 for automatic environmental data collection and analysis, according to non-limited implementations. System 100 comprises: a data collection tool 101, an optional GPS base station 110, an end-user terminal 120, a server 140, a data collection interface device 150, and a data collection terminal 160. The end-user terminal 120, data collection interface device 150, data collection terminal 160, are in communication with server 140 via links 130, which can be wireless and/or wireless as desired. Data collection tool 101 and optional GPS base station 110 are in communication with one or more of server 140 and data collection interface device 150 via a communication network 180, which can be wired and/or wireless as desired. In some implementations, network 180 can comprise links 130.

Figure 2:
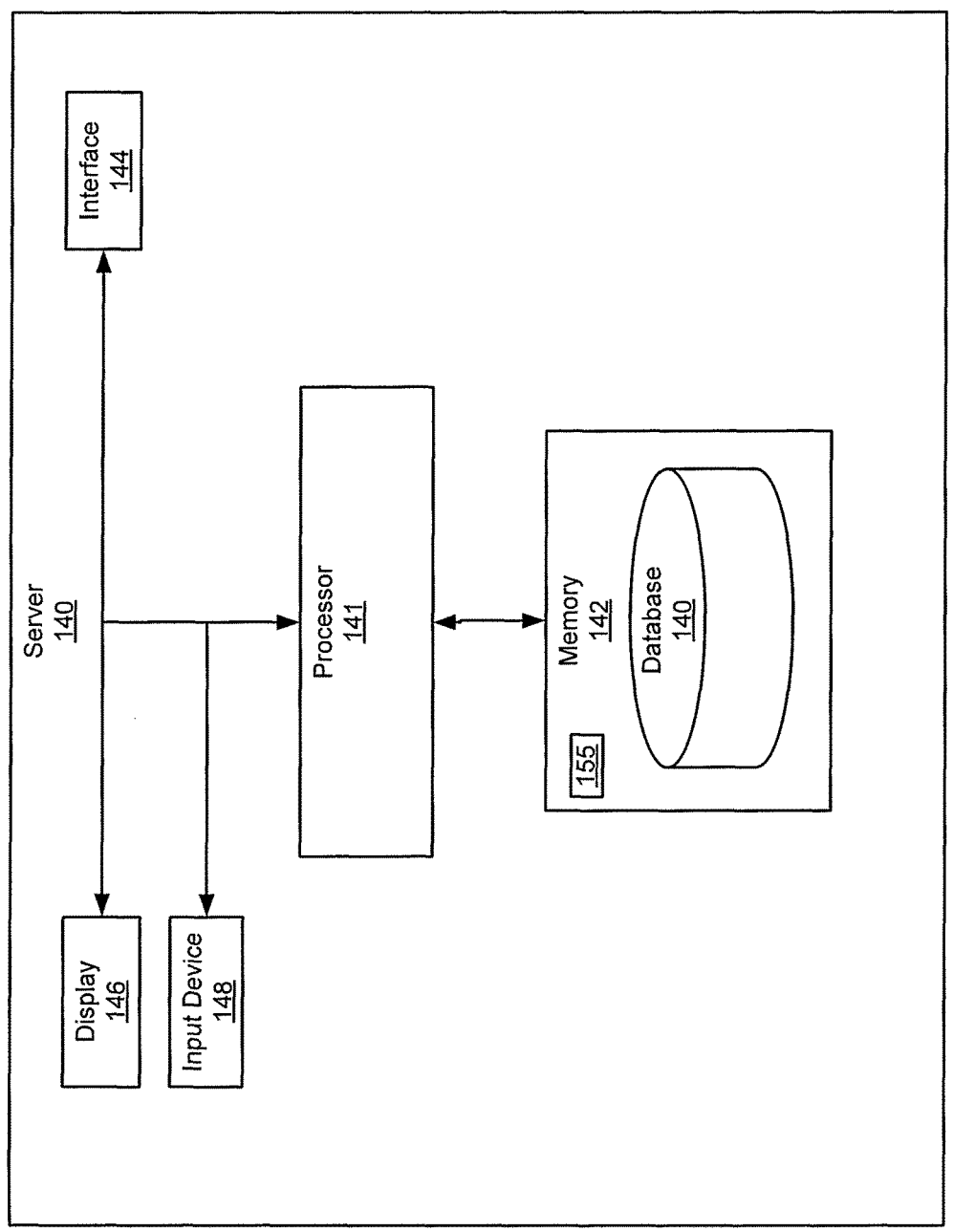
FIG. 2 depicts a schematic diagram of a server for automatic environmental data collection and analysis, according to non-limiting implementations.

Attention is next directed to FIG. 2, which depicts a non-limiting implementation of server 140 comprising: a processor 141, a memory 142, and a communication interface 144, and optionally: a display 146, and an input device 148 (which can be internal or external to server 140 as desired). Server 140 can include, but is not limited to, any suitable combination of electronic devices, communication devices, computing devices, personal computers, servers, laptop computers, and the like. In some implementations, server 140 can be based on any well-known server environment including a module that houses one or more central processing units, volatile memory (e.g. random access memory), persistent memory (e.g. hard disk devices) and network interfaces to allow server 140 to communicate over a link to network 180. For example, server 140 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 140 are contemplated. It is further more appreciated that server 140 can comprise any suitable number of servers that can perform different functionality of server implementations described herein. In yet further implementations, server 140 can comprise one or more virtualized servers.

Otherwise server 140 can comprise at least one input device 148 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from interface 144, and/or input device 148, is received at processor 141 (which can be implemented as a plurality of processors, including but not limited to one or more central processors (CPUs)). Processor 141 is configured to communicate with a memory 142 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of server 140 as described herein are typically maintained, persistently, in memory 142 and used by processor 141 which makes appropriate utilization of volatile storage during the execution of such programming instructions. Those skilled in the art will now recognize that memory 142 is an example of computer readable media that can store programming instructions executable on processor 141. Furthermore, memory 142 is also an example of a memory unit and/or memory module.

Memory 142 further stores an application 155 that, when processed by processor 141, enables processor 141 to: receive, using communication interface 144, a geographic survey request from a first computing device; translate the geographic survey request into mission data for collecting geographic survey data; transmit, using communication interface 144, the mission data to a second computing device associated with a geographic survey entity; receive, using communication interface 144, the geographic survey data collected by the geographic survey entity using the mission data; analyze the geographic survey data to generate processed geographic survey data; and, transmit, using communication interface 144, the processed geographic survey data to the first computing device. For example the first computing device can comprise end-user terminal 120, and the second computing device can comprise one or more of data collection tool 101 and data collection interface device 150.

Furthermore, memory 142 storing application 155 is an example of a computer program product, comprising a non-transitory computer usable medium having a computer readable program code adapted to be executed to implement a method, for example a method stored in application 155.

Processor 141 can be further configured to communicate with optional display 146, which can comprise any suitable one of, or combination of, flat panel displays (e.g. LCD (liquid crystal display), plasma displays, OLED (organic light emitting diode) displays, capacitive or resistive touchscreens, CRTs (cathode ray tubes) and the like). In some implementations, display 146, and/or input device 148 can be external to server 140, with processor 141 in communication with each of input device 148 and display 146 via a suitable connection and/or link.

Processor 141 also connects to communication interface 144 (interchangeably referred to interchangeably as interface 144), which can be implemented as one or more radios and/or connectors and/or network adaptors and/or transceivers, configured to wirelessly communicate with one or more communication networks, including links 130 and network 180. It will be appreciated that interface 144 is configured to correspond with network architecture that is used to implement one or more communication links 130 and links to network 180, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like), wireless data, Bluetooth links, NFC (near field communication) links, WLAN (wireless local area network) links, WiFi links, WiMax links, packet based links, the Internet, analog networks, the PSTN (public switched telephone network), access points, and the like, and/or a combination.

While not depicted, server 140 further comprises a power source, for example a connection to a mains power supply and a power adaptor (e.g. and AC-to-DC (alternating current to direct current) adaptor, and the like).

In any event, it should be understood that a wide variety of configurations for server 140 are contemplated.

While not depicted, each of data collection tool 101, end-user terminal 120, a data collection interface device 150, and data collection terminal 160 comprises a respective processor, a respective memory and a respective communication interface, respectively similar to processor 141, memory 142, and interface 144, configured, however, for the respective functionality of each of data collection tool 101, end-user terminal 120, a data collection interface device 150, and data collection terminal 160 as described hereafter.

Figure 3:
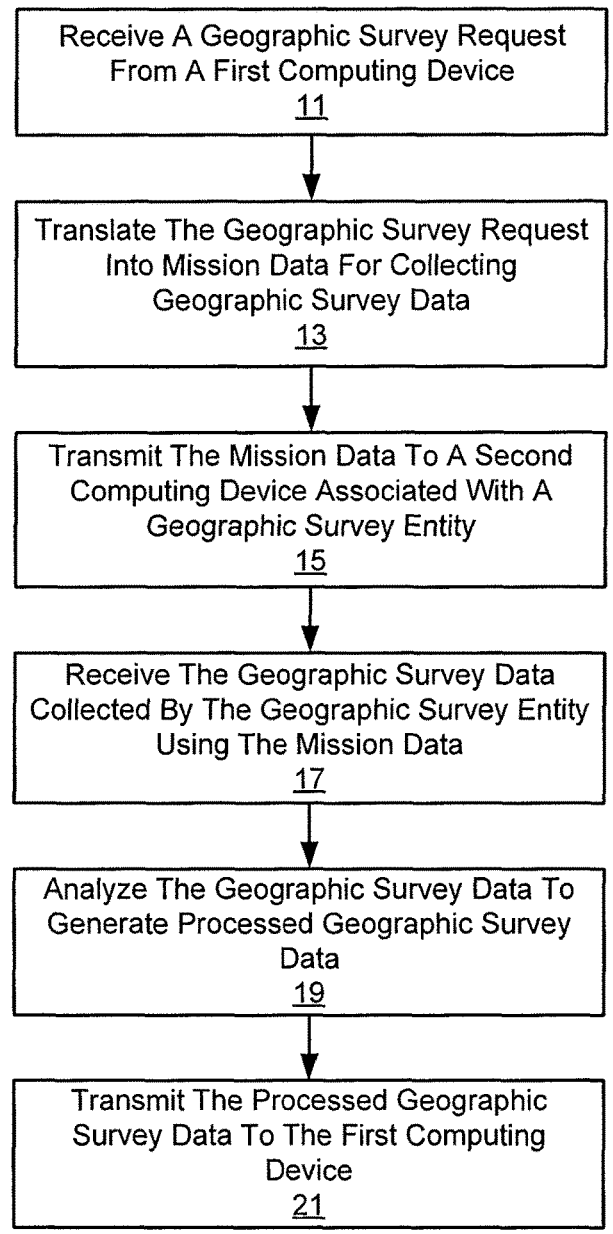
FIG. 3 depicts a block diagram of a flowchart of a method for automatic environmental data collection and analysis, according to non-limiting implementations.

Attention is next directed to FIG. 3 which depicts a flowchart illustrating a method 10 for acquiring images for automatic environmental data collection and analysis, according to non-limiting implementations. In order to assist in the explanation of method 10, it will be assumed that method 10 is performed using system 100. Furthermore, the following discussion of method 10 will lead to a further understanding of system 100 and its various components. However, it is to be understood that system 100 and/or method 10 can be varied, and need not work exactly as discussed herein in conjunction with each other, and that such variations are within the scope of present implementations. It is appreciated that, in some implementations, method 10 is implemented in system 100 by processor 141 of server 140, for example by implementing application 155.

It is to be emphasized, however, that method 10 need not be performed in the exact sequence as shown, unless otherwise indicated; and likewise various blocks may be performed in parallel rather than in sequence; hence the elements of method 10 are referred to herein as "blocks" rather than "steps". It is also to be understood that method 10 can be implemented on variations of system 100 as well.

At block 11, processor 141 receives, using interface 144, a geographic survey request from a first computing device, for example end-user terminal 120.

At block 13, processor 141 translates the geographic survey request into mission data for collecting geographic survey data.

At block 15, processor 141 transmits, using interface, 144 the mission data to a second computing device associated with a geographic survey entity. The second computing device can comprise one or more of data collection tool 101 and data collection interface device 150.

At block 17, processor 141 receives, using interface 144, the geographic survey data collected by the geographic survey entity using the mission data.

At block 19, processor 141 analyzes the geographic survey data to generate processed geographic survey data.

At block 21, processor 141 transmits, using interface 144, the processed geographic survey data to the first computing device.

Hence, server 140 "sits in between" an organization requesting environmental data (which, for example, operates the first computing device and/or end-user terminal 120) and surveying entities (which operate the second computing device and/or data collection tool 101 and data collection interface device 150), translating requests for geographic survey data to mission data that is understandable and/or processable by the second computing device and/or a geographic survey entity associated with the second computing device which can include, but is not limited to a data collection tool such as an unmanned vehicle. The geographic survey entity collects geographic survey data according to the mission data and transmits geographic survey data back to server 140. In general, the geographic survey data is in a raw form and/or is not analyzed by the geographic survey entity. Hence, server 140 analyzes/processes the geographic survey data and/or translates the geographic survey data into processed geographic survey data, which generally comprises data understandable the organization requesting the environmental data.

As will be described in more detail below, the geographic survey request comprises one or more of: a location to survey; transect data; buffer data; mission definition data; and a request for one or more of: volume of a body of water; depth of the body of water; sediment in the body of water; fish locations in the body of water; traffic patterns; surface area; average temperatures; approximate triangular meshes; perimeter estimation; area estimation; cross-section extraction; historical trending; gradient computation; 2D building plans; environmental contamination; water quality; air quality; positions of salient objects; soil chemistry; flow rates; and 3D models of the environment. Transect data and buffer data generally describe a path of an unmanned vehicle when collecting the geographic survey data.

Processor 141 can is further configured to: check whether the geographic survey request comprises a viable geographic survey request; and, response to determining that the geographic survey data comprise unviable geographic survey request, transmitting another request for updated geographic survey data to first computer. For example, the geographic survey request can describe a path on a body of water that is not possible for an unmanned surface craft to undertake and/or the geographic survey request can describe a data collection mission that can be very long and/or very expensive to undertake, as determined by comparing estimates of the length and cost of the mission to threshold values. In yet further implementations, the geographic survey request can describe a data collection mission for which no geographic surveying entity exists that can implement the mission. In any event, in response to find a geographic survey request unviable, server 140 can provide to the first computer a suggested viable geographic survey request which describes a viable data collection mission.

Processor 141 can be further configured to: generate an estimate of one or more of a time and a cost to provide the processed geographic survey data; transmit the estimate to the first computing device prior to transmitting the mission data to a second computing device; and proceed with transmitting the mission data to a second computing device when an acceptance of the estimate is received from the first computing device. Hence, for example, prior to transmitting the mission data, server 140 can further provide an estimate of time and/or cost of providing the processed geographic survey data to the organization requesting the environmental data, which has the options of either approving the time and/or cost, and providing a new geographic survey request which, in principle, would be faster and/or cheaper to implement.

Processor 141 can be further configured to: compare the geographic survey request with sets of existing geographic survey data stored in a memory, such as memory 142; and, when the geographic survey request corresponds to one or more of the sets of existing geographic survey data, then one or more of skipping the translate, the transmit and the receive (e.g. blocks 13-17), and analyze the one or more of the sets of existing geographic survey data to generate the processed geographic survey data. In other words, the existing geographic survey data, when analyzed, can provide the desired processed geographic survey data that the organization is requesting. For example, the existing geographic survey data can comprises geographic survey data that was collected in manner similar to parameters received with the geographic survey request. In some of these implementations, the time and cost estimation described above can be based on analyzing the existing geographic survey data. In other implementations, analyzing the existing geographic survey data can occur when an age of the existing geographic survey data is below a given threshold value, for example less than about one year old, though the threshold age can be set by a administrator of server 140 and/or specified in the geographic survey request.

In yet further implementations, server 140 can confirm with the first computing device whether the existing geographic survey data can be analyzed and/or whether new geographic survey data is to be collected. In other words, environmental data can be time sensitive; hence, in some instances, even when existing geographic survey data was collected in a preceding few weeks, the organization requesting the environmental data can prefer to have up to date environmental data. Indeed, aspects of the present specification enable the organization to receive up-to-date environmental data without having to engage/deploy/program the geographic survey entity themselves or even analyze the raw geographic survey data.

In some implementations, the mission data comprises data for instructing one or more of a data collection tool, a robot, an unmanned vehicle, an unmanned survey craft, an unmanned aerial vehicle, and an unmanned ground vehicle to collect the geographic survey data, for example data collection tool 101. In other words, server 140 can translate the geographic survey request to programming instructions that can be processed by data collection tool 101 and the like.

In some, implementations, however, the mission data comprises data for instructing a surveyor to collect the geographic survey data, including, but not limited to, a human surveyor who working for and/or with the geographic survey entity and/or a company associated therewith.

In yet further implementations, server 140 can be configured to select a geographic survey entity, based on data stored at memory 142, to which the mission data is to be sent; for example, memory 142 can comprise a database, and the like, of geographic survey entities stored in association with their geographic location and capabilities. Server 140 can hence select a geographic survey entity based on same. For example, when an organization requesting environmental data provides a location to survey in the geographic survey request, server 140 can compare the location with locations of geographic survey entities stored in memory 142, and select a geographic survey entity that is located within a given distance from the location and/or is capable of collecting geographic survey data. For example, when the geographic survey request includes a request for traffic patterns, road data, and the like (i.e. environmental data that can be acquired from the air using an unmanned aerial vehicle and/or a helicopter), a geographic survey entity that has the capability of acquiring environmental data from the air is selected instead of a geographic survey entity that is capable only of collecting environmental data for bodies of water.

The geographic survey data can comprises one or more of: bathymetric data; distance data; fish location data; traffic data; perimeter estimation; area estimation; cross-section extraction; historical trending; gradient computation; building plans; 2D (two dimensional) building plans; environmental contamination; water quality; air quality; positions of salient objects; soil chemistry; flow rates; 3D (three dimensional) models of the environment; and the like.

In any event, once the mission data is transmitted to the second computing device and the geographic survey data is collected, the second computing device transmits the geographic survey data to server 140, and server 140 processes and/or analyzes the geographic survey data to generate processed geographic survey data. The processed geographic survey data can include, but is no limited to one or more of: volume of a body of water; depth of the body of water; sediment in the body of water; fish locations in the body of water; traffic patterns; surface area; average temperatures; approximate triangular meshes; perimeter estimation; area estimation; cross-section extraction; historical trending; gradient computation; 2D building plans; environmental contamination; water quality; air quality; positions of salient objects; soil chemistry; flow rates; and 3D models of the environment. In some implementations, the processed geographic survey data can include, but is not limited to, a comparison between current environmental data represented by the processed geographic survey data and historical environmental data as represented by existing geographic survey data stored at memory 142 (and/or historical environmental data stored in memory 142 which can be associated with the existing geographic survey data).

Returning to FIG. 1, a mission definition process can be initialized, for example by an end-user interacting with end-user terminal 120 (e.g. a first computer as in method 10) to define a data collection mission 190. A data collection mission 190 (e.g. a geographic survey request) is communicated to server 140 via a communication link 130. The graphic user interface (GUI) which is presented on the end-user terminal 120 can be presented by way of a native application residing on the end-user terminal 120, by way of a web interface or other "thin-client" method, or a combination of both. Communication links 130 can include physical links, wired links, wireless links, or a combination of same. As described above, the server 140 can be a physical server, a virtualized server, a group of physical servers, or any other similar implementation which provides equivalent functionality.

Each of a plurality of data collection teams/surveying entities/as second computer (as in method 10) is presented with available data collection missions 190 on a data collection terminal 160 which itself is also connected to the server 140 via a communication link 130. In other words, server 140 transmits one or more data collection missions to data collection terminal 160. Upon acceptance of a data collection mission 190 at data collection terminal 160, the data collection mission 190 becomes available for transfer to a data collection interface device 150 by way of another instance of a communication link 130. Once the data collection mission 190 is present on a data collection interface device 150, it can be transferred within network 180 to data collection tool 101 and a data collection execution method 390, as described below with reference to FIG. 6, can be carried out. The data collection tool 101 can have its performance augmented with offboard sensors, such as optional GPS base station 110. Data from a GPS base station 110 or the like may be transferred via the network 180. Once a data collection mission 190 has been completed, collected data (e.g. geographic survey data) is transferred via the network 180 to the server 140 where a data analysis method 840 can be implemented, as described below with reference to FIG. 10.

The collected data is analysed at server 140 and the analysis results made available for access by an end-user via the end-user terminal 120. In other words, server 140 transmits processed geographic survey data to end-user terminal 120 It should be apparent for one skilled in the art that the end-user terminal 120 which is used to define the initial data collection mission 190 is not necessarily the same end-user terminal 120 which can be used to view the results of the data collection mission 190. System 100 can be further configured for review of the results of the data collection mission 190 via the data collection terminal 160 and the data analysis method 840 before presentation to the end-user.

Figure 4:
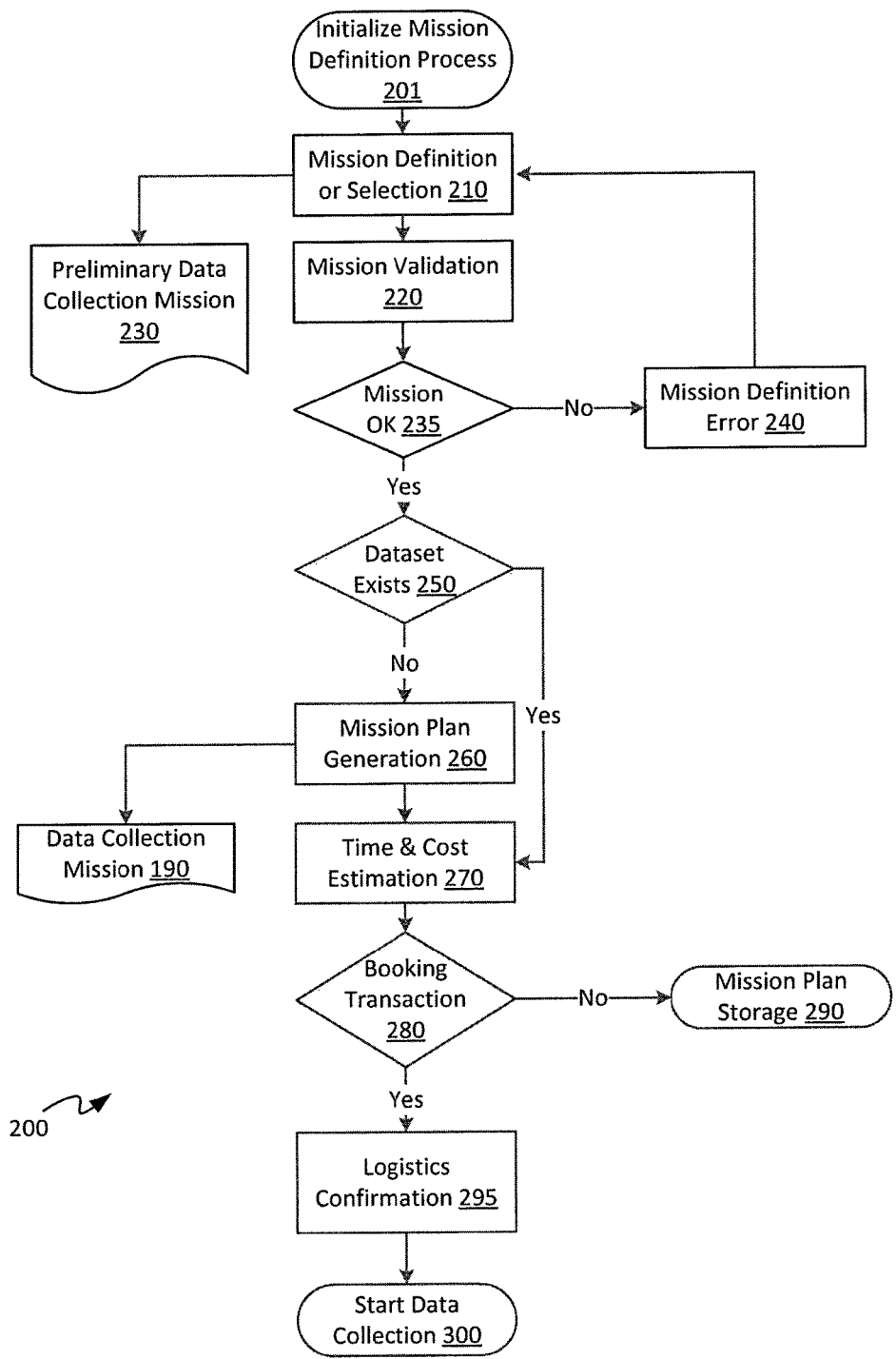
FIG. 4 depicts a block diagram of a flowchart of a method for defining a data collection mission, according to non-limiting implementations.

Attention is next directed to FIG. 4 which depicts a block diagram of a flowchart of a method 200 for defining a data collection mission, according to non-limited implementations. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present implementations. It is appreciated that, in some implementations, method 200 is implemented in system 100 at least in part by processor 141 of server 140, and respective processors at data collection toll 101, end-user terminal 120, data collection interface device 150, and data collection terminal 160.

It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood that method 200 can be implemented on variations of system 100 as well. Furthermore, method 200 described further aspects of method 10.

The initialize mission generation process (block 201) represents the initial presentation of a data collection user interface 310 (described below with reference to FIG. 5) to the end-user, after which the end-user defines a Preliminary Data Collection Mission 230 and/or selects a previously defined Preliminary Data Collection Mission 230 via a mission definition or selection process (block 210) which allows the user to either define a new mission using a data collection user interface 310 or to select a previously defined mission from a list. Mission definition can include, but is not limited to, defining a path that an unmanned vehicle is to travel to collect environmental data, such as a starting point, transects and a buffer, as well as environmental data that is to be provided to the organization requesting the environmental data (e.g. water volume, and the like, as described above). Upon this definition, mission validation (block 220) occurs and the Preliminary Data Collection Mission 230 is checked for basic viability (block 235). When the mission is not found to be viable, a mission definition error (block 240) can be presented and the end-user is returned to the mission definition or selection process (block 210) for refinement. If the mission is found to be viable, a check is performed against a list of pre-existing Preliminary Data Collection Mission 230 items to check if a similar mission has already been carried out (b lock 250). If it has not, a full Data Collection Mission 190 is generated (block 260) and its associated time and cost estimated by a time & cost estimation module (block 270). When a similar mission has been carried out already, the time & cost estimation module (block 270) will use a different mode which does not take into account the time & cost of collecting the data.

The end-user is then able to interact confirm that a Data Collection Mission 190 is acceptable for immediate execution by confirming payment arrangements (block 280). If the end-user does not desire immediate execution of a Data Collection Mission 190, it can be stored for later retrieval (block 290). For example, a Data Collection Mission 190 can be retrieved by a mission definition or selection module (block 210). If immediate execution is desired, logistics confirmation (block 295) occurs and data collection can begin (block 300).

Figure 5:
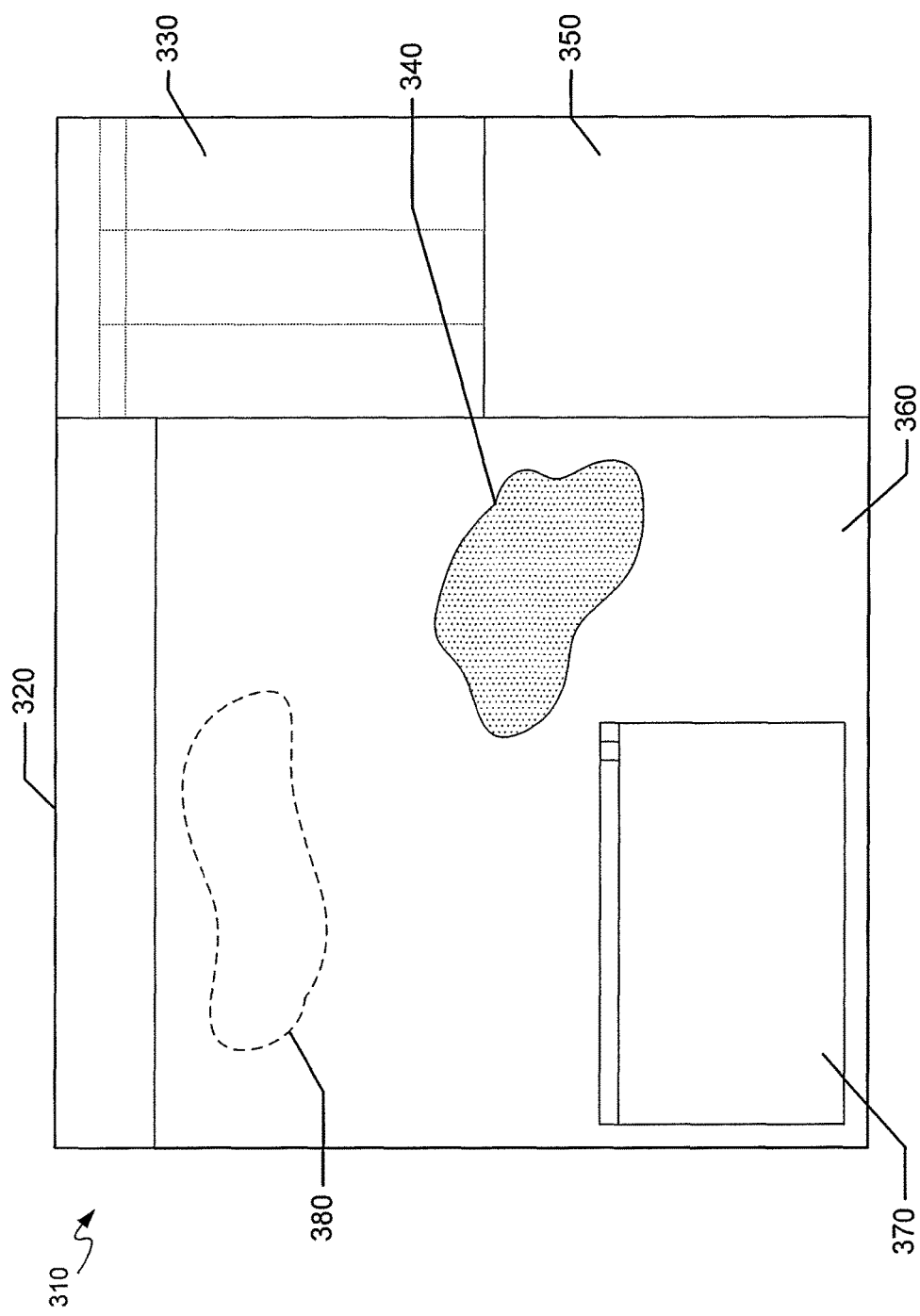
FIG. 5 depicts an example data collection user interface as presented to an end-user, according to non-limiting implementations.

Attention is next directed to FIG. 5, which depicts a non-limiting example implementation of a data collection user interface 310 which can be presented on end-user terminal 120, for example in a browser, a thin client, and the like. Interface 310 comprises a basemap 360 which comprises a top-down view of the earth, which can be centered roughly on an area of interest and/or interaction therewith can results in centering on the area of interest. The imagery presented in the basemap 360 can be of many top-down formats, including topographic maps, aerial imagery, or surveyed floor plans. Existing survey geometry 340 can be overlaid for selection, or new survey geometry 380 can be input by, the user using tools from a button bar 320. The data collection user interface 310 also provides a list of survey geometry in a pane 330, which can be optionally filtered or ordered by proximity to the current field of view of the basemap 360 or other attributes such as age or size. Upon selection of survey geometry 340, 380, attributes are displayed in a detail section pane 350. In some implementations, additional information or data can be presented via a floating frame 370. Data collection user interface 310 can be designed in a modular fashion wherein tools can be added and used in a non-modal manner. In a non-limiting example implementation, an end-user can view attributes relating to survey geometry 340, 380 in a floating frame 370, and create a second instance of a floating frame 370 to show attributes relating to a second set of survey geometry 340, 380 without hiding results from their previous analysis.

Figure 6:
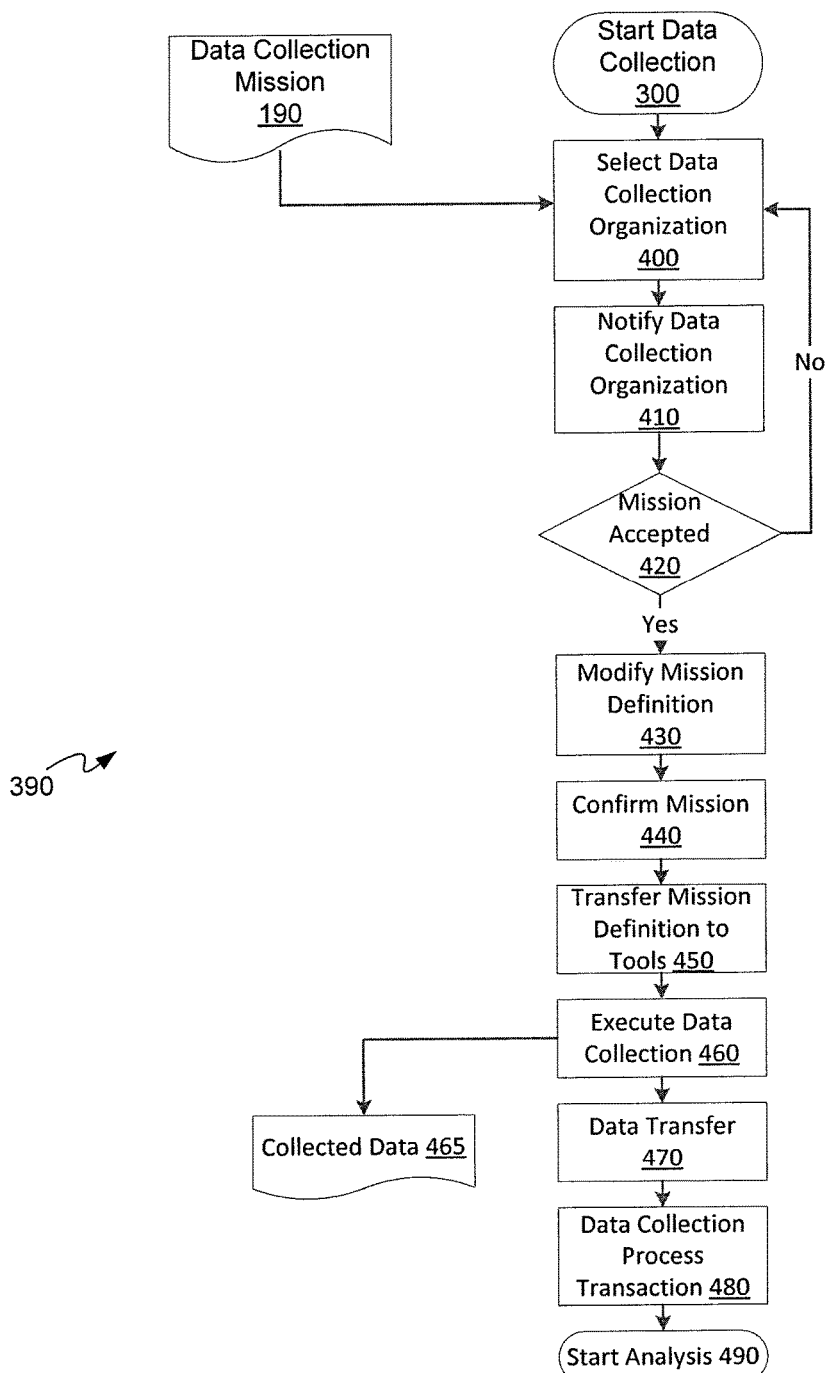
FIG. 6 depicts a block diagram of a flowchart of a method for carrying out a data collection mission, according to non-limiting implementations.

Attention is next directed to FIG. 6 which depicts a block diagram of a flowchart of a data collection method 390, according to non-limited implementations. In order to assist in the explanation of method 390, it will be assumed that method 390 is performed using system 100. Furthermore, the following discussion of method 390 will lead to a further understanding of system 100 and its various components. However, it is to be understood that system 100 and/or method 390 can be varied, and need not work exactly as discussed herein in conjunction with each other, and that such variations are within the scope of present implementations. It is appreciated that, in some implementations, method 390 is implemented in system 100, at least in part, by processor 141 of server 140, and respective processors at data collection tool 101, end-user terminal 120, data collection interface device 150, and data collection terminal 160.

It is to be emphasized, however, that method 390 need not be performed in the exact sequence as shown, unless otherwise indicated; and likewise various blocks may be performed in parallel rather than in sequence; hence the elements of method 390 are referred to herein as "blocks" rather than "steps". It is also to be understood that method 390 can be implemented on variations of system 100 as well. Furthermore, method 390 described further aspects of method 10.

Method 390 can be initiated when a Data Collection Mission 190 has been defined and a directive to start data collection (block 300) has been issued. In a non-limiting example implementation, the data collection mission generation process 200 is used to create the Data Collection Mission 190 and issue a directive to start data collection (block 300). When the directive to start data collection (block 300) has been issued, a data collection organization is selected (block 400). Example selection criteria include proximity to the Data Collection Mission 190, capabilities of the data collection organization with respect to the requirements posed by the Data Collection Mission 190, and past performance of the data collection organization. The selected data collection organization is then notified (block 410) via email, text message, phone, and the like (e.g. mission data can be transmitted to data collection terminal 160). A user interface, including, but not limited to, collection review interface 500, described below with reference to FIG. 7, can be presented at data collection terminal 160 to enable the data collection organization to review and accept the Data Collection Mission 190 (block 420). Alternatively, the data collection organization can receive a notice of selection using a data collection execution review interface 500 to proactively check for the presence of an assigned Data Collection Mission 190. When the Data Collection Mission 190 is not accepted, block 400 is again implemented to select a new data collection organization. When the Data Collection Mission 190 is accepted, the data collection organization can manually and/or automatically modify the Data Collection Mission 190 based on experience and/or data stored in a memory accessible to data collection terminal 160 (block 430). Examples of such modifications can include, but are not limited to, logistics details, sensor types, and data collection speeds. The Data Collection Mission 190 can then be reconfirmed with the end-user (block 440). Upon this confirmation, the Data Collection Mission 190 can optionally be transferred to a data collection interface device 150 via a communication link 130, after which the Data Collection Mission 190 can be further transferred to a data collection tool 101 by way of a network 180 (block 450). Data collection can then occur (block 460).

An example implementation of a data collection tool 101, described below with reference to FIG. 9, can include an unmanned survey craft 740 equipped with a GPS system 810 and sonar module 830; the unmanned survey craft 740 can be directed via a data collection execution user interface 630 (described below with reference to FIG. 8) presented by a data collection interface device 150. Upon completion of the data collection (block 460), Collected Data 465 (e.g. geographic survey data) can be transferred via a network 180 and/or manually via a physical storage medium to server 140 (block 470). Using a physical storage medium to transfer the Collected Data 465 can also include the physical storage medium being connected to the data collection interface device 150 and/or data collection terminal 160 instead of directly to the server 140, and the remainder of the transfer being performed using a communication link 130. Once the transfer is complete, a transaction may optionally occur wherein the data collection organization is compensated in part or in full for their efforts (block 480). The details of such a transaction can be based on quantified past performance, commercial terms, a combination, and the like. Automatic and/or manual analysis of the Collected Data 465 can then begin (block 490).

Figure 7:
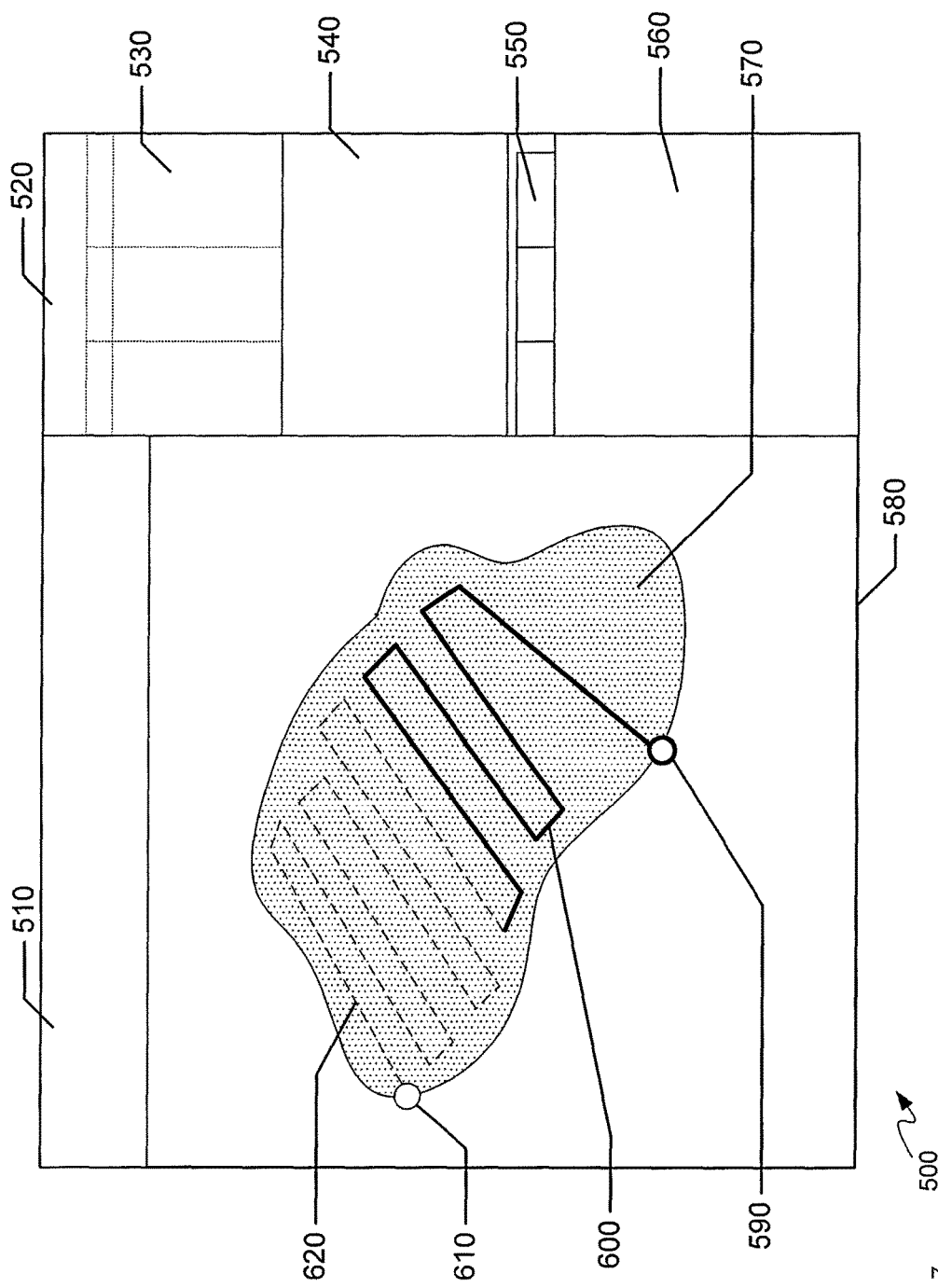
FIG. 7 depicts an example user interface as presented to a survey entity and/or data collection team, according to non-limiting implementations.

Attention is next directed to FIG. 7 which depicts an example data collection review interface 500, according to non-limiting implementations. Interface 500 comprises a GUI which can enable a data collection organization to review and modify one or more received Data Collection Missions 190. Interface 500 identifies a current Data Collection Mission 190 being worked on by a current project identifier pane 520 and also presents a list of available projects in a pane 530. Upon initial selection of a potential Data Collection Mission 190, details and an option to download the selected Data Collection Mission 190 if it is not already available is made via a review pane 540. The review pane 540 can also comprise options for rejecting or submitting a Data Collection Mission 190 for approval by an end-user. Details on specific parts which can make up a Data Collection Mission 190 can be presented at a detail pane 560, and different parts can be selected by a tab bar 550 and the like.

A main portion of the data collection review interface 500 comprises a review basemap 580 which presents a top-down view of the earth, centered roughly on the area of the Data Collection Mission 190. The imagery presented in the review basemap 580 can be of many top-down formats, including topographic maps, aerial imagery, or surveyed floor plans. The desired geometry 570 to be surveyed is displayed on the review basemap 580, with a proposed collection route 620 and proposed collection startpoint 610 also presented graphically. The proposed collection route 620 can be based on transects and a buffer received at block 11 of method 10 and/or defined at block 210 of method 200. Transects can comprise a number of side to side movements on a path (e.g. proposed collection route 620 has 10 transects from a bottom left side of geometry 570 to a top right side of geometry 570; i.e. a transect can comprise a number of times a path moves from shore to shore of a body of water). A buffer can comprise a distance from an end of a transect to a side of geometry 570; i.e. a buffer can comprise a distance from an end of a transect to the shore of body of water).

In some implementations, interface 500 can comprise tools at a button bar 510 for modifying the Data Collection Mission 190. Such modifications can include the creation of a modified collection route 600 (e.g. changing transects and/or a buffer), the relocation of the proposed collection startpoint 610 to a modified collection startpoint 590, and the like.

Figure 8:
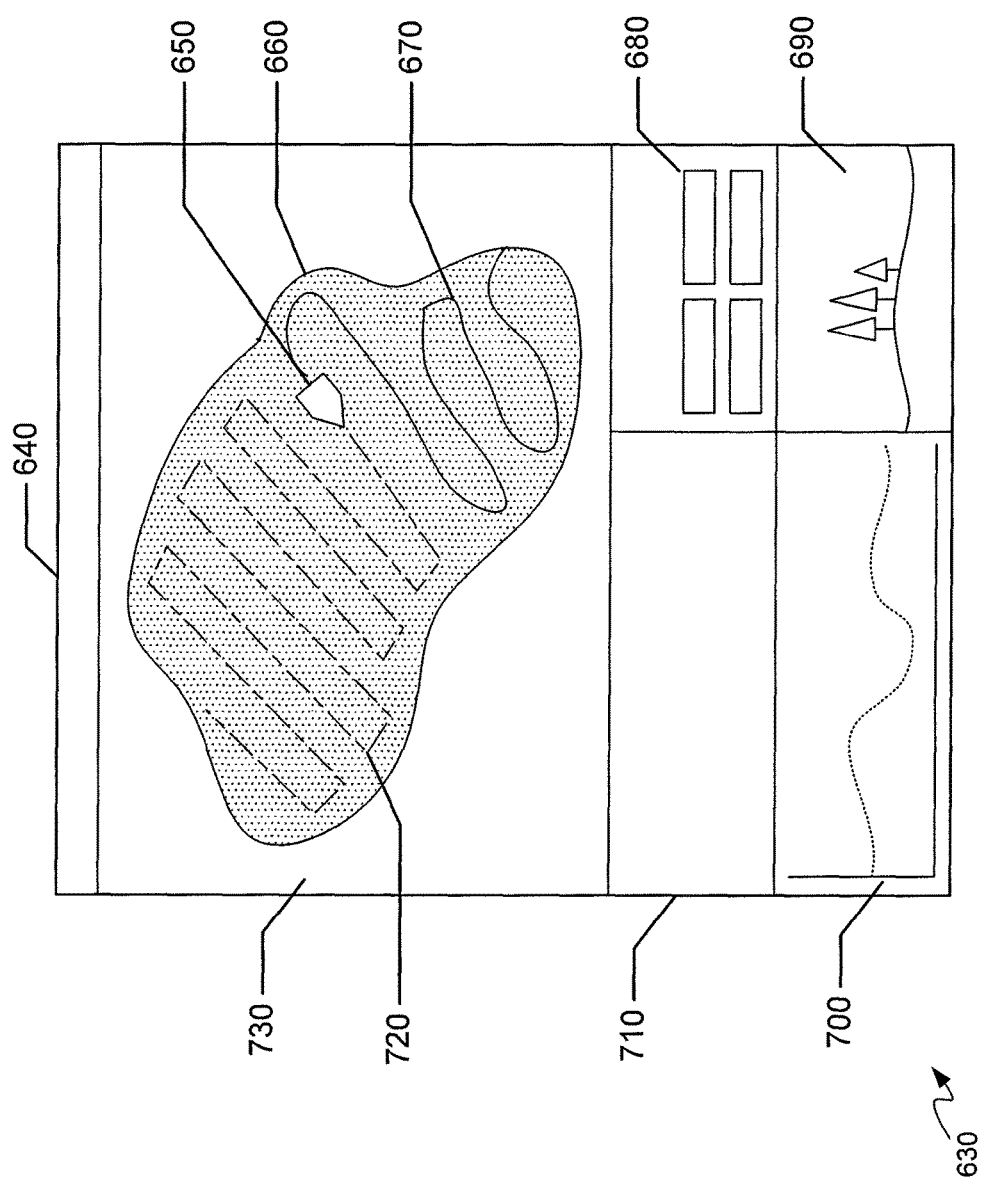
FIG. 8 depicts an example user interface of a data collection tool, according to non-limiting implementations.

Attention is next directed to FIG. 8 which depicts a data collection user interface 630, according to non-limiting implementations. Data collection user interface 630 can be proved at data collection interface device 150 to control a data collection tool 101, including, but not limited to unmanned survey craft 740. Interface 630 can include an information bar 640 which comprises details such as identification of the Data Collection Mission 190 being executed, connection state of the data collection tool 101, battery status of the data collection tool 101, and the like. In some implementations, bar 640 can provide information designated as critical. Interface 630 can include a general data collection control panel 680 with options to start, pause, restart, or stop the data collection at data collection tool 101, engage different modes of the data collection tool 101, and/or issue other similar commands. Information from the data collection tool 101 can optionally be presented in real time at interface 500 to the operator in a variety of formats (though network latency can cause such presentation to be near real-time). Visual feedback can be directly presented via a camera display 690, while abstract data can be presented by a chart display 700. It is appreciated interface 630 is merely an example, and interface 630 can be modified to present both visual and abstract data in other ways, for example to maximize effectiveness of the presentation.

When the data collection tool 101 is enabled to analyse data during the collection process, results of this analysis can be presented at an analysis window 710. Examples of such analysis can include, but are not limited to, area surveyed, quality of data, time remaining in the data collection and the like. A main portion of the data collection user interface 630 comprises a collection basemap 730 which presents a top-down view of the earth, centered roughly on the area of the Data Collection Mission 190. The imagery presented in the collection basemap 730 can be of many top-down formats, including but not limited to, topographic maps, aerial imagery, surveyed floor plans and the like. A desired geometry 660 to be surveyed can be displayed on the collection basemap 730, with the historical path 670 and remaining path 720 also displayed. The position and orientation of the data collection tool 101 can also be displayed via a location icon 650. The location icon 650 can optionally provide additional information about a status of the data collection tool 101, by one or more of changing in a visual appearance of the location icon 650, providing status popups, and the like.

Figure 9:
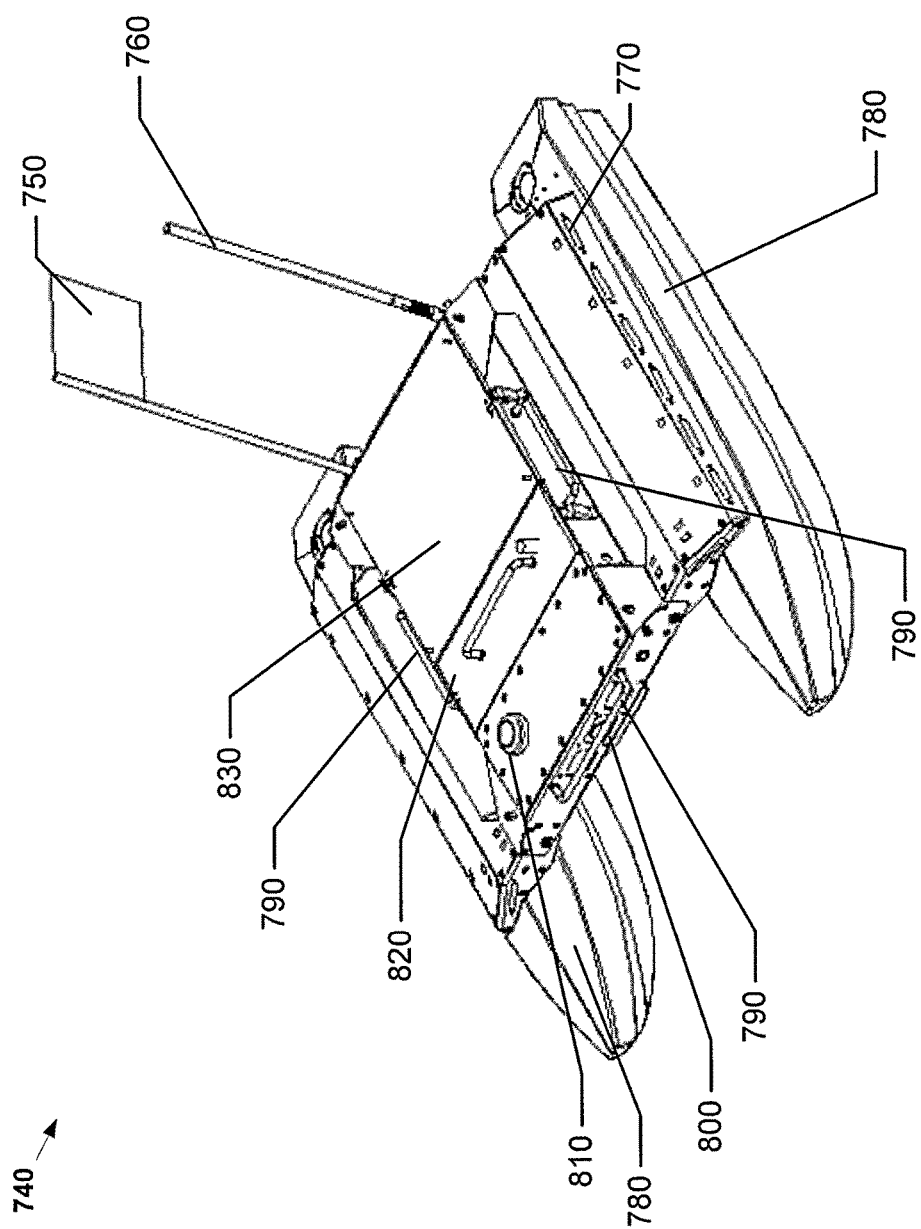
FIG. 9 depicts an unmanned surface vessel representative of a data collection tool, according to non-limiting implementations.

Attention is next directed to FIG. 9 which depicts of an exterior of an unmanned survey craft 740, according to non-limiting implementations. In some implementations, data collection tool 101 can comprise unmanned survey craft 740. Unmanned survey craft 740, as depicted, comprises a plurality of hulls 780. Each hull 780 can also comprise features to support any internally mounted equipment. It is appreciated that any suitable hull design is within the scope of present implementations. The unmanned survey craft 740 can comprise a plurality of carrying handles 790. The unmanned survey craft 740 can comprise active signalling devices such as navigation lights 770 and/or passive signaling devices such as flags 750. In depicted example implementations, the unmanned survey craft 740 can comprise a sensing, communications, and/or interfacing hardware, including, but not limited to a communications antenna 760, an internally mounted camera 800, GPS system 810 and sonar module 830. In depicted example implementations, the unmanned survey craft 740 may be powered by a battery 820 which may be enabled to be removable.

In any event, while in depicted implementations, data collection tool 101 can comprise unmanned survey craft 740, in other implementations, data collection tool 101 can comprise one or more of a robot, an unmanned vehicle, an unmanned aerial vehicle, and an unmanned ground vehicle. For example, an manned ground vehicle can be used to collect samples to determine soil contamination levels. In yet further implementations, data collection tool 101 can be hand-held and/or transportable by a user to collect environmental data, including, but not limited to, environmental contamination; water quality; air quality; positions of salient objects; soil chemistry; flow rates; survey data, such as gradients and 3D models of the environment.

Figure 10:
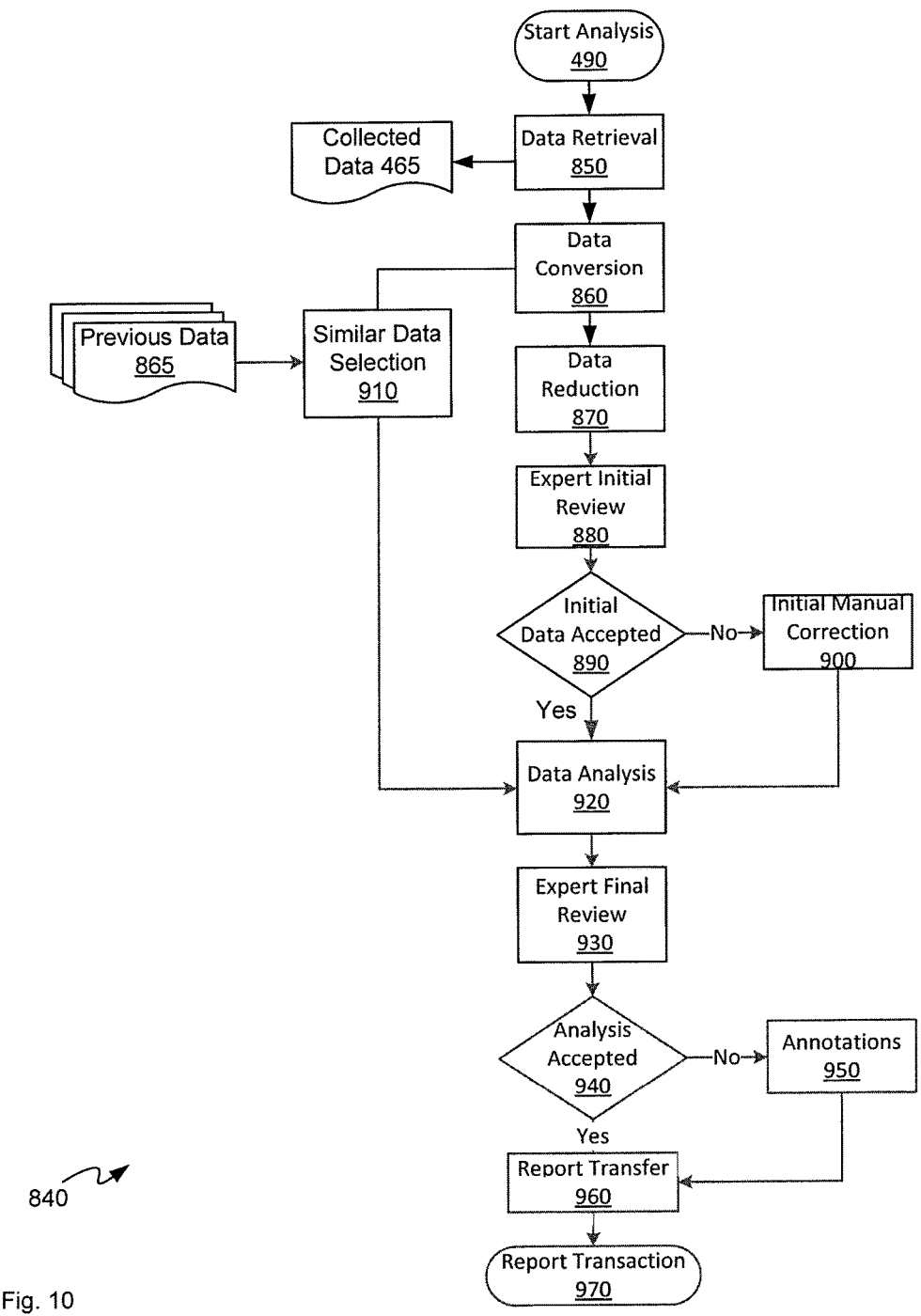
FIG. 10 depicts a block diagram of a flowchart of a method for analysing mission data, according to non-limiting implementations.

Attention is next directed to FIG. 10 which depicts a block diagram of a flowchart of a data analysis method 840, according to non-limited implementations. In order to assist in the explanation of method 840, it will be assumed that method 840 is performed using system 100. Furthermore, the following discussion of method 840 will lead to a further understanding of system 100 and its various components. However, it is to be understood that system 100 and/or method 840 can be varied, and need not work exactly as discussed herein in conjunction with each other, and that such variations are within the scope of present implementations. It is appreciated that, in some implementations, method 840 is implemented in system 100, at least in part, by processor 141 of server 140.

It is to be emphasized, however, that method 840 need not be performed in the exact sequence as shown, unless otherwise indicated; and likewise various blocks may be performed in parallel rather than in sequence; hence the elements of method 840 are referred to herein as "blocks" rather than "steps". It is also to be understood that method 840 can be implemented on variations of system 100 as well. Furthermore, method 840 described further aspects of method 10.

Furthermore, method 840 can commence when block 490 of method 390 is implemented, and/or when Collected Data 465 is available and a directive to start data analysis (block 490) has been issued. Collected Data 465 is retrieved for analysis (block 850) at server 140 and converted into a format which is appropriate for analysis (block 860); for example "raw" collected data can be converted to data that can be input into analysis software. Previous Data 865 can be optionally analyzed for similarity to the Collected Data 465 (block 910). Similarity can be determined from properties such as sensor type, location of collection, time of collection, size of data set, or the like. The Collected Data 465 can undergoes a data reduction process (block 870) to remove redundant data, errors, or noise. An expert can optionally be presented with a data analysis interface 980 which allows the expert to examine the Collected Data 465 for errors (block 880). When the expert does not accept the data (block 890), the expert can perform manual corrections to the Collected Data 465 (block 900) before analysis begins.

Otherwise, automatic analysis proceeds (block 920) based on the Collected Data 465 and any additional similar data as identified by block 910. Examples of automatic analysis include, but are not limited to, estimation of: volume of a body of water; depth of the body of water; sediment in the body of water; fish locations in the body of water; traffic patterns; surface area; average temperatures; approximate triangular meshes; perimeter estimation; area estimation; cross-section extraction; historical trending; gradient computation; building plans; environmental contamination; water quality; air quality; positions of salient objects; soil chemistry; and flow rates. The automatic analysis (block 920) also optionally incorporates includes formatting the results of the analysis in a human-readable form, such as a formatted document (which can include logos). The automatic analysis (block 920) can optionally include conversion of numeric values into commentary based on defined rules. An expert can be presented with the results of the automatic analysis (block 930) for review and acceptance (block 940), where they are optionally able to annotate the results (block 950). Upon acceptance or annotation, the report is transferred to the end-user (block 960), and any final financial transactions are completed (block 970).

Figure 11:
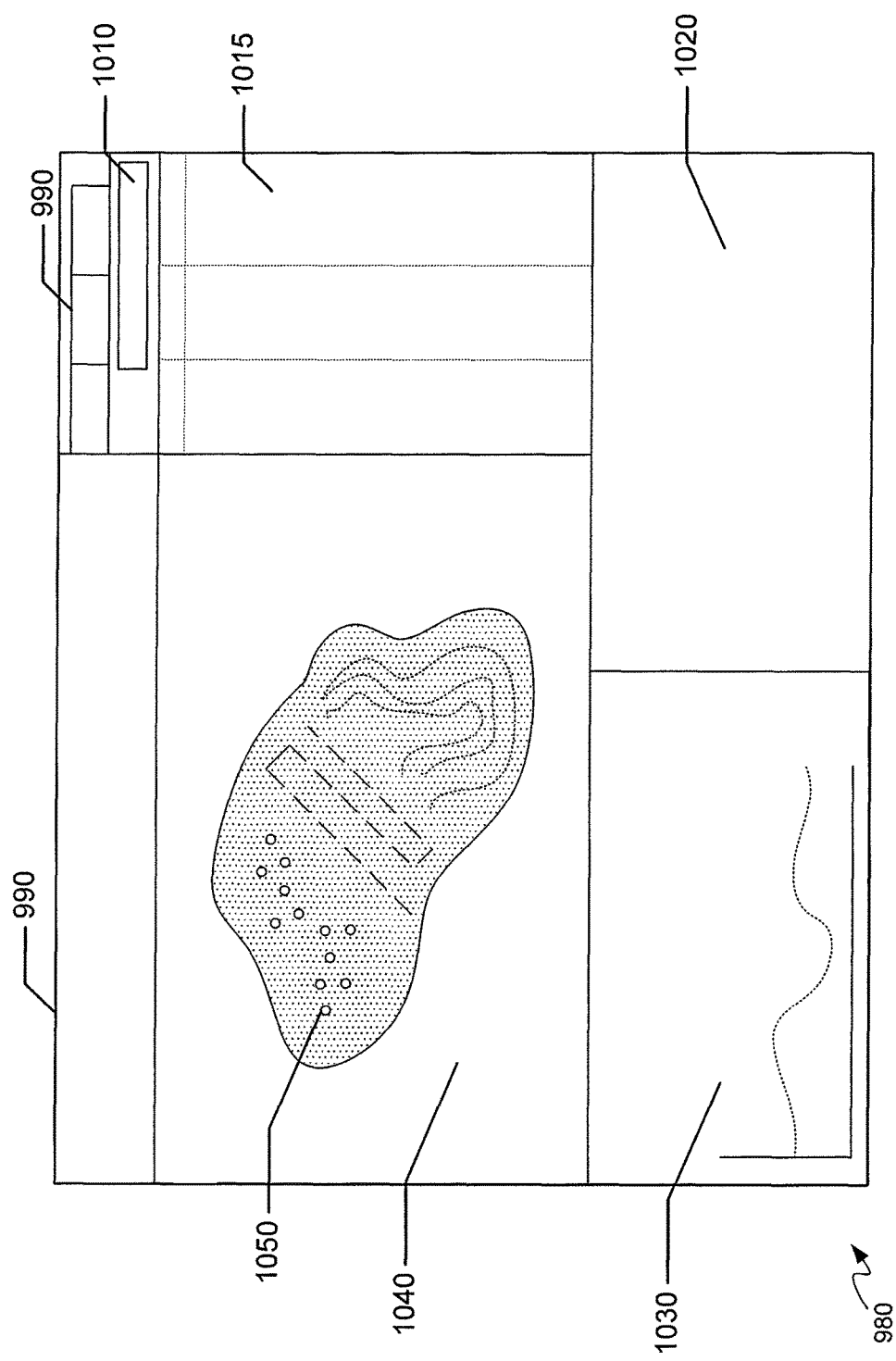
FIG. 11 depicts an example user interface used for mission analysis, according to non-limiting implementations.

Attention is next directed to FIG. 11 which depicts an example data analysis interface 980, according to non-limiting implementations. Data analysis interface 980 can be presented to an expert at display 146 of server 140, as part of data analysis block 920 of method 840. Data analysis interface 980 can comprises an analysis tab bar 990 which allows an expert to select a particular item of Collected Data 465. Data analysis interface 980 can comprise a query field 1010 which can provide another interface for searching for Collected Data 465, with results being presented in a selection table 1015. Upon selection of an item of Collected Data 465, statistics are presented in a statistics table 1030 and the associated analysis basemap 1040 can displayed in a main portion of the data analysis interface 980. The analysis basemap 1040 presents a top-down view of the earth, centered roughly on the area of the Collected Data 465. The imagery presented in the analysis basemap 1040 can be of many top-down formats, including topographic maps, aerial imagery, and/or surveyed floor plans. The Collected Data 465 is can be rendered as both raster or vector imagery 1050 and overlaid onto the analysis basemap 1040. The both raster or vector imagery 1050 can be edited and/or annotated via tools found in the analysis button bar 990. In addition, analysis results can also be incorporated into the both raster or vector imagery 1050. Upon selection of parts of the both raster and/or vector imagery 1050, analysis results can be optionally displayed in the analysis detail window 1020. The data analysis interface 980 can be further enabled to export and/or import one of data and reports via tools found in the analysis button bar 990.

In some implementations, once a mission is defined, data collection and analysis can proceed automatically and/or without intervention by a user. For example, an organization requesting environmental data could comprise a fishing lodge and/or a fishing guide company that provides fishing tours on a lake. A survey entity could comprise an unmanned surface vehicle comprising a fish finder that is generally docked at the lake. The organization could request, via server 140, that fish locations in the lake be determined at a given time each day, for example at 4 am. Server 140 can cause the unmanned surface vehicle to deploy each day on the lake at the given time to collect fish finder data, which is transmitted to server 140 for analysis. Server 140 can then provide the organization with locations of schools of fish so that fisherman and/or guides know where to fish that day.

In yet another example, an organization requesting environmental data could comprise a municipality that wants to monitor water volume and/or sediment in a lake. The organization can transmit a request for water volume and/or sediment in the lake to server 140, which can mediate the request with a surveying entity. The surveying entity can collect bathymetric data for the lake, using an unmanned surface craft, and transmit the bathymetric data to the server 140 for analysis. Server 140 can process the bathymetric data to determine lake volume and/or sediment thickness and transmit these values to a computing device associated with the municipality in a report, without the raw bathymetric data. The municipality can request such environmental data periodically so that environmental data about the lake can be tracked over time. Without server 140 and/or system 100, the municipality would have to waste time finding a surveying company to survey the lake, and dedicate resources to analysing the bathymetric data. Further, as server 140 can store the reports and/or the bathymetric data, future reports can include comparisons to the collected environmental data. Further, when another organization makes a request for similar data at server 140, the data can be provided quickly and at lower cost, as server 140 stores the reports and/or bathymetric data so that redundant surveying missions can be avoided.

Provided herein are a system, apparatus and method for automatic environmental data collection and analysis. A server provides mediation between organizations requesting and/or needing environmental data, and surveying entities which can collect geographic survey data, which reduces time for the organizations to receive the environmental data they are requesting. Indeed, as global warming continues to have a major impact on world, quick and easy access to environmental data and/or collection of environmental data is becoming more and more important.

Those skilled in the art will appreciate that in some implementations, the functionality of data collection tool 101, end-user terminal 120, server 140, data collection interface device 150, and data collection terminal 160 can be implemented using pre-programmed hardware or firmware elements (e.g., application specific integrated circuits (ASICs), electrically erasable programmable read-only memories (EEPROMs), etc.), or other related components. In other implementations, the functionality of data collection tool 101, end-user terminal 120, server 140, data collection interface device 150, and data collection terminal 160 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., radio-frequency (RF), microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system for automatic environmental data collection and analysis comprising:
   an unmanned vehicle associated with a geographical survey entity; and
   a server in communication with the unmanned vehicle, comprising:
   a processor and a communication interface, the processor configured to:
      receive, using the communication interface, a geographic survey request from a first computing device;
      determine whether one or more sets of existing geographic survey data stored in a memory is sufficient to satisfy the geographic survey request;
      in response to determining the geographic survey request can be satisfied with the one or more sets of existing geographic survey data:
         analyze the one or more of the sets of existing geographic survey data to generate a processed geographic survey data; and
         transmit, using the communication interface, the processed geographic survey data to the first computing device; and in response to determining the geographic survey request cannot be satisfied with the one or more of the sets of existing geographic survey data:
translate the geographic survey request into mission data for collecting geographic survey data, wherein the mission data comprises data for instructing the unmanned vehicle to collect the geographic survey data;
transmit, using the communication interface, the mission data to a second computing device associated with the geographic survey entity;
receive, using the communication interface, the geographic survey data collected by the geographic survey entity using the mission data and the unmanned vehicle;
analyze the geographic survey data to generate processed geographic survey data; and,
transmit, using the communication interface, the processed geographic survey data to the first computing device.

2. The system of claim 1, wherein the geographic survey request comprises one or more of: a location to survey; transect data; buffer data; mission definition data; and a request for one or more of: volume of a body of water; depth of the body of water; sediment in the body of water; fish locations in the body of water; traffic patterns; surface area; average temperatures; approximate triangular meshes; perimeter estimation; area estimation; cross-section extraction; historical trending; gradient computation; building plans; 2D (two dimensional) building plans; environmental contamination; water quality; air quality; positions of salient objects; soil chemistry; flow rates; and 3D (three dimensional) models of the environment.

3. A system for automatic environmental data collection and analysis comprising:
an unmanned vehicle associated with a geographical survey entity; and
a server in communication with the unmanned vehicle, comprising:
a processor and a communication interface, the processor configured to:
receive, using the communication interface, a geographic survey request from a first computing device;
compare the geographic survey request with sets of existing geographic survey data stored in a memory;
if the geographic survey request corresponds to one or more of the sets of existing geographic survey data, then:
analyze the one or more of the sets existing geographic data to generate a processed geographic survey data; and
transmit, using the communication interface, the processed geographic survey data to the first computing device; and
if the geographic survey request does not correspond to one or more of the sets of existing geographic survey data, then:
translate the geographic survey request into mission data for collecting geographic survey data, wherein the mission data comprises data for instructing the unmanned vehicle to collect the geographic survey data;
transmit, using the communication interface, the mission data to a second computing device associated with the geographic survey entity;
receive, using the communication interface, the geographic survey data collected by the geographic survey entity using the mission data and the unmanned vehicle;
analyze the geographic survey data to generate processed geographic survey data; and,
transmit, using the communication interface, the processed geographic survey data to the first computing device;
wherein the processor is further configured to: check whether the geographic survey request comprises a viable geographic survey request; and, response to determining that the geographic survey request comprises unviable geographic survey request, transmit another request for updated geographic survey data.

4. The system of claim 3, wherein the another request for updated geographic survey data comprises a suggested viable geographic survey request.

5. The system of claim 1, wherein the processor is further configured to: generate an estimate of one or more of a time and a cost to provide the processed geographic survey data; transmit the estimate to the first computing device prior to transmitting the mission data to a second computing device; and proceed with transmitting the mission data to a second computing device when an acceptance of the estimate is received from the first computing device.

6. The system of claim 1, wherein the unmanned vehicle is one of a robot, an unmanned survey craft, an unmanned aerial vehicle, and an unmanned ground vehicle.

7. The system of claim 1, wherein the geographic survey data comprises one or more of: bathymetric data; distance data; fish location data; traffic data; perimeter estimation; area estimation; cross-section extraction; historical trending; gradient computation; building plans; 2D (two dimensional) building plans; environmental contamination; water quality; air quality; positions of salient objects; soil chemistry; flow rates; and 3D (three dimensional) models of the environment.

8. A method comprising:
at a server comprising a processor and a communication interface; operating the processor to:
receive, using the communication interface, a geographic survey request from a first computing device;
determining whether one or more sets of existing geographic survey data stored in a memory is sufficient to satisfy the geographic survey request;
in response to determining the geographic survey request cannot be satisfied with the one or more of the sets of existing geographic survey data:
translate the geographic survey request into mission data for collecting geographic survey data, wherein the mission data comprises data for instructing an unmanned vehicle to collect geographic survey data; and
transmit, using the communication interface, the mission data to a second computing device associated with a geographic survey entity;
control the unmanned vehicle associated with the second computing device to collect the geographic survey data based on the mission data; and
receive using the communication interface, the geographic survey data collected by the geographic survey entity using the mission data;
analyze the geographic survey data to generate processed geographic survey data; and, transmit, using the communication interface, the processed geographic survey data to the first computing device.

9. The method of claim 8, wherein the geographic survey request comprises one or more of: a location to survey; transect data; buffer data; mission definition data; and a request for one or more of: volume of a body of water; depth of the body of water; sediment in the body of water; fish locations in the body of water; traffic patterns; surface area; average temperatures; approximate triangular meshes; perimeter estimation; area estimation; cross-section extraction; historical trending; gradient computation; building plans; 2D (two dimensional) building plans; environmental contamination; water quality; air quality; positions of salient objects; soil chemistry; flow rates; and 3D (three dimensional) models of the environment.

10. The method of claim 8, further comprising: operating the processor to checking whether the geographic survey request comprises a viable geographic survey request; and, in response to determining the geographic survey request comprises unviable geographic survey request, transmitting another request for updated geographic survey data.

11. The method of claim 10, wherein the another request for updated geographic survey data comprises a suggested viable geographic survey request.

12. The method of claim 8, further comprising: operating the processor to generate an estimate of one or more of a time and a cost to provide the processed geographic survey data; transmitting the estimate to the first computing device prior to transmitting the mission data to a second computing device; and proceed with transmitting the mission data to a second computing device when an acceptance of the estimate is received from the first computing device.

13. The method of claim 8, wherein the unmanned vehicle is one of a robot, an unmanned survey craft, an unmanned aerial vehicle, and an unmanned ground vehicle.

14. The method of claim 8, wherein the geographic survey data comprises one or more of: bathymetric data; distance data; fish location data; traffic data; perimeter estimation; area estimation; cross-section extraction; historical trending; gradient computation; building plans; 2D (two dimensional) building plans; environmental contamination; water quality; air quality; positions of salient objects; soil chemistry; flow rates; and 3D (three dimensional) models of the environment.

* * * * *